(12) United States Patent
Nakata (10) Patent No.: US 11,634,172 B2
(45) Date of Patent: Apr. 25, 2023

(54) STEERING DEVICE AND STEERING SYSTEM INCLUDING STEERING DEVICES

(71) Applicant: TOYOTA JIDOSHA KABUSHIKI KAISHA, Toyota (JP)

(72) Inventor: Daisuke Nakata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/118,911

(22) Filed: Dec. 11, 2020

(65) Prior Publication Data

US 2021/0245798 A1  Aug. 12, 2021

(30) Foreign Application Priority Data

Feb. 11, 2020  (JP) .............................. JP2020-021065

(51) Int. Cl.
*B62D 5/04*  (2006.01)
(52) U.S. Cl.
CPC .................................. *B62D 5/0481* (2013.01)
(58) Field of Classification Search
CPC .. B62D 5/0481; B62D 5/049; B62D 15/0245; B62D 5/0418; B62D 5/0469
See application file for complete search history.

(56) References Cited

U.S. PATENT DOCUMENTS

| 6,415,215 | B1 * | 7/2002 | Nishizaki | B62D 6/003 |
| | | | | 701/72 |
| 9,227,657 | B2 * | 1/2016 | Hayama | B62D 1/043 |
| 10,556,621 | B2 * | 2/2020 | Oya | B62D 6/006 |

(Continued)

FOREIGN PATENT DOCUMENTS

| BR | 102021003558 A2 * | 10/2021 | ............ B60W 10/20 |
| CN | 106956717 A * | 7/2017 | |

(Continued)

OTHER PUBLICATIONS

"Driver-vehicle closed-loop simulation of differential drive assist steering control system for motorized-wheel electric vehicle;" Wang et al., 2009 IEEE Vehicle Power and Propulsion Conference (pp. 564-571); Sep. 1, 2009. (Year: 2009).*

(Continued)

*Primary Examiner* — Khoi H Tran
*Assistant Examiner* — Jorge O Peche
(74) *Attorney, Agent, or Firm* — Sughrue Mion, PLLC (57) ABSTRACT

A steering device installed on a vehicle including a plurality of steerable wheels and configured to independently steer a wheel which is one of the plurality of steerable wheels, including: an electric motor as a drive source; a motion converting mechanism configured to convert a motion of the electric motor into a steering motion of the wheel; and a controller configured to control a supply current to the electric motor so as to achieve steering of the wheel corresponding to a motion position of the electric motor, wherein, to eliminate a discrepancy between the motion position of the electric motor and a steering position of the wheel detected based on the supply current to the electric motor supplied when the motion position of the electric motor is maintained at a straight-traveling-state position, the controller executes a reference change process of changing a setting of the straight-traveling-state position.

5 Claims, 5 Drawing Sheets

(56) References Cited

U.S. PATENT DOCUMENTS

| | | | |
|---|---|---|---|
| 2010/0004825 A1* | 1/2010 | Nakano | B62D 6/003 |
| | | | 701/42 |
| 2010/0204888 A1* | 8/2010 | Nishioka | B60G 7/003 |
| | | | 701/41 |
| 2014/0353054 A1 | 12/2014 | Matayoshi et al. | |
| 2015/0307336 A1* | 10/2015 | McVicar | B62D 5/0418 |
| | | | 180/19.2 |
| 2017/0073001 A1* | 3/2017 | Oya | B62D 6/02 |
| 2017/0151978 A1* | 6/2017 | Oya | B62D 5/005 |
| 2018/0065658 A1* | 3/2018 | Aoki | B62D 5/0463 |
| 2018/0065659 A1* | 3/2018 | Aoki | B62D 5/0466 |
| 2018/0099692 A1 | 4/2018 | Oya | |
| 2019/0047541 A1* | 2/2019 | Dockter | B60W 10/20 |
| 2019/0100236 A1* | 4/2019 | De Carteret | B62D 6/008 |
| 2019/0329819 A1* | 10/2019 | Shan | B60G 3/06 |
| 2020/0223478 A1 | 7/2020 | Sano | |
| 2021/0009193 A1* | 1/2021 | Ooba | B62D 17/00 |
| 2021/0229736 A1* | 7/2021 | Ogata | B62D 5/04 |
| 2021/0245795 A1* | 8/2021 | Nakata | B62D 5/0418 |
| 2021/0245798 A1* | 8/2021 | Nakata | B62D 5/0481 |
| 2021/0253159 A1* | 8/2021 | Toyoda | B62D 6/002 |
| 2021/0300457 A1* | 9/2021 | Kuribayashi | B62D 6/002 |
| 2021/0394821 A1* | 12/2021 | Kakimoto | B62D 6/002 |
| 2021/0403078 A1* | 12/2021 | Sano | B60G 3/26 |
| 2022/0297746 A1* | 9/2022 | Washnock | B62D 3/126 |
| 2022/0297747 A1* | 9/2022 | Polmans | B62D 5/001 |

FOREIGN PATENT DOCUMENTS

| | | | | |
|---|---|---|---|---|
| CN | 112298344 A | * | 2/2021 | B62D 5/006 |
| CN | 112441114 A | * | 3/2021 | B62D 5/049 |
| CN | 113264105 A | * | 8/2021 | B60K 7/0007 |
| CN | 113815712 A | * | 12/2021 | B62D 5/006 |
| CN | 113815714 A | * | 12/2021 | B62D 15/021 |
| CN | 114620117 A | * | 6/2022 | |
| DE | 102017223288 A1 | * | 6/2019 | B62D 5/001 |
| DE | 102006036819 B4 | * | 10/2019 | B60C 23/0416 |
| DE | 102018215557 A1 | * | 3/2020 | B62D 5/001 |
| EP | 1935739 A1 | * | 6/2008 | B60W 10/20 |
| EP | 3865375 A1 | * | 8/2021 | B60K 7/0007 |
| EP | 3925862 A1 | * | 12/2021 | B62D 5/006 |
| JP | H03153466 A | * | 7/1991 | |
| JP | H03178876 A | * | 8/1991 | |
| JP | H05147551 A | * | 6/1993 | |
| JP | H06211149 A | * | 8/1994 | |
| JP | H06239256 A | * | 8/1994 | |
| JP | H06247330 A | * | 9/1994 | |
| JP | 2007-001564 A | | 1/2007 | |
| JP | 2013-103665 A | | 5/2013 | |
| JP | 2019151327 A | * | 9/2019 | B62D 5/04 |
| JP | 2019171904 A | * | 10/2019 | |
| JP | 2019171914 A | * | 10/2019 | |
| JP | 2019202571 A | * | 11/2019 | |
| JP | 2020-111270 A | | 7/2020 | |
| JP | 2020158051 A | * | 10/2020 | |
| JP | 2021091354 A | * | 6/2021 | |
| JP | 2021098406 A | * | 7/2021 | |
| JP | 2022053017 A | * | 4/2022 | B62D 6/002 |
| KR | 101612670 B1 | * | 4/2016 | |
| KR | 102173996 B1 | * | 11/2020 | |
| KR | 20210122048 A | * | 10/2021 | |
| KR | 20220118114 A | * | 8/2022 | |
| RU | 2749924 C1 | * | 6/2021 | B60W 10/20 |
| WO | WO-2016148112 A1 | * | 9/2016 | B62D 5/04 |
| WO | WO-2019065780 A1 | * | 4/2019 | B62D 5/04 |
| WO | 2019/189097 A1 | | 10/2019 | |
| WO | WO-2019189104 A1 | * | 10/2019 | |
| WO | WO-2021004484 A1 | * | 1/2021 | A01D 34/006 |
| WO | WO-2021140080 A1 | * | 7/2021 | B62D 15/025 |

OTHER PUBLICATIONS

"Motor motion control of automobile Steer-by-Wire system in electric vehicles;" Lei-yan et al., 2009 IEEE Vehicle Power and Propulsion Conference (pp. 1502-1505); Sep. 1, 2009. (Year: 2009).*

"Development of a Four Wheel Independent Drive and Four Wheel Independent Steer Electric Vehicle;" Zhao et al., 2015 Sixth International Conference on Intelligent Systems Design and Engineering Applications (ISDEA) (pp. 319-322); Aug. 1, 2015. (Year: 2015).*

"A Novel Steering System for a Space-Saving 4WS4WD Electric Vehicle: Design, Modeling, and Road Tests;" Zhang et al., IEEE Transactions on Intelligent Transportation Systems (vol. 18, Issue: 1, pp. 114-127); Jan. 1, 2017. (Year: 2017).*

* cited by examiner

STEERING DEVICE AND STEERING SYSTEM INCLUDING STEERING DEVICES

CROSS REFERENCE TO RELATED APPLICATION

The present application claims priority to Japanese Patent Application No. 2020-021065, which was filed on Feb. 11, 2020, the disclosure of which is herein incorporated by reference in its entirety.

BACKGROUND

Technical Field

The following disclosure relates to a steering device installed on a vehicle for steering one wheel of the vehicle and a steering system including a plurality of the steering devices.

Description of Related Art

A steering device configured to independently steer one wheel of a vehicle by a force generated by an electric motor has been recently proposed as disclosed in Japanese Patent Application Publication No. 2013-103665, for instance. This steering device will be hereinafter referred to as "single-wheel independent steering device" where appropriate.

SUMMARY

The single-wheel independent steering device need not necessarily include a sensor for detecting a steering position of a wheel. In view of this, on condition that the steering position of the wheel and a motion position of the electric motor match to each other, the single-wheel independent steering device can achieve, based on the motion position of the electric motor, steering of the wheel corresponding to the motion position of the electric motor. However, there may be cases where a discrepancy is generated between the motion position of the electric motor and the steering position of the wheel due to some reason. If the single-wheel independent steering device is configured to be capable of executing a process for eliminating such a discrepancy, the utility of the single-wheel independent steering device is enhanced. Accordingly, one aspect of the present disclosure is directed to a single-wheel independent steering device having high utility. Another aspect of the present disclosure is directed to a steering system including a plurality of the single-wheel independent steering devices and having high utility.

In one aspect of the present disclosure, a steering device installed on a vehicle including a plurality of steerable wheels and configured to independently steer a wheel which is one of the plurality of steerable wheels includes:
 an electric motor as a drive source;
 a motion converting mechanism configured to convert a motion of the electric motor into a steering motion of the wheel; and
 a controller configured to control a supply current to the electric motor so as to achieve steering of the wheel corresponding to a motion position of the electric motor,
 wherein, to eliminate a discrepancy between a motion position of the electric motor and a steering position of the wheel detected based on the supply current to the electric motor supplied when the motion position of the electric motor is maintained at a straight-traveling-state position, the controller executes a reference change process of changing a setting of the straight-traveling-state position.

Here, "changing a setting of the straight-traveling-state position" may be expressed as adjusting the straight-traveling-state position.

In another aspect of the present disclosure, a steering system, in which the steering device constructed as described above is provided for each of at least three wheels of the vehicle, is configured to:
 identify that the discrepancy between the motion position of the electric motor and the steering position of the wheel is generated in the steering device provided for one wheel among the at least three wheels when i) the supply current to the electric motor is not less than a set current in the steering device provided for the one wheel among the at least three wheels and ii) the supply current to the electric motor is less than the set current in the steering devices each provided for a corresponding one of at least two wheels which are the reminder of the at least three wheels except the one wheel; and
 execute the reference change process of changing the setting of the straight-traveling-state position so as to eliminate the discrepancy in the steering device provided for the one wheel among the at least three wheels.

The steering device according to the present disclosure is capable of executing the reference changing process described above, so that the discrepancy or difference between the steering position of the wheel and the motion position of the electric motor can be easily eliminated. In the steering system according to the present disclosure, the supply current to the electric motor in one steering device is compared with the supply current to the electric motor in each of other steering devices, thus making it possible to easily identify that the discrepancy is generated between the motion position of the electric motor and the steering position of the wheel in the one steering device and to easily eliminate the discrepancy in the one steering device based on the identification. Consequently, the steering device and the steering system according to the present disclosure have high utility.

Various Forms

In a case where the electric motor is a rotary-type motor, the motion position of the electric motor means a rotation angle position of a motor shaft, namely, a motor rotation angle of the electric motor. Similarly, the steering position of the wheel means a steering angle of the wheel. Moreover, the motion position of the electric motor may be regarded as a motion amount from a straight-traveling-state position that is the motion position of the electric motor in a state in which the vehicle is traveling straight. Similarly, the steering position of the wheel may be regarded as a rotation angle amount from a straight-traveling-state position that is the steering position of the wheel in the state in which the vehicle is traveling straight. The straight-traveling-state position set for the steering position of the wheel is a reference, and the straight-traveling-state position set for the motion position of the electric motor is a reference. These straight-traveling-state positions are set so as to match to each other, whereby the steering position of the wheel can be appropriately controlled by controlling the motion position of the electric motor.

Basic control by the controller may be executed as follows. The controller may determine a target motion position that is the motion position of the electric motor corresponding to the steering position to which the wheel is to be steered and may determine the supply current to the electric motor based on a motion position deviation that is a deviation of an actual motion position of the electric motor with respect to the target motion position. The target motion position or a target steering position that is the steering position to which the wheel is to be steered may be determined by a steering operation by a driver, for instance. Specifically, the supply current to the electric motor may be determined according to a feedback control law based on the motion-position deviation. For instance, a situation is considered in which the wheel is steered from the straight-traveling-state position by a certain steering amount. For maintaining the steering position in this situation, it is preferable to supply a certain electric current to the electric motor that enables application, to the wheel, of a force that counters a force for returning the wheel to the straight-traveling-state position. (The force for returning the wheel to the straight-traveling-state position may be regarded as "self-aligning force" that is also referred to as "self-aligning torque".) in other words, even in a state in which a degree of the steering operation does not change, it is preferable to supply, to the electric motor, a maintaining current necessary for maintaining the steering position of the wheel at the target steering position. To this end, a gain for an integral term in an expression for determining the supply current according to the feedback control law may be determined appropriately, for instance.

The discrepancy between the steering position of the wheel and the motion position of the electric motor may be identified as follows, for instance. That is, it may be identified that the discrepancy between the steering position of the wheel and the motion position of the electric motor is generated when the supply current to the electric motor is not less than a set current in a state in which the motion position of the electric motor is maintained at the straight-traveling-state position or in a state in which the motion position of the electric motor is estimated to be maintained at the straight-traveling-state position. When the steering position of the wheel is located at the straight-traveling-state position, the self-aligning torque is small and the supply current to the electric motor is accordingly small. In view of this, the discrepancy is identified to be generated if a relatively large current is being supplied to the electric motor in the state in which the motion position of the electric motor is located at the straight-traveling-state position for causing the steering position of the wheel to be located at the straight-traveling-state position.

The reference changing process may be executed as follows. In the reference changing process, the controller may cut off the supply current to the electric motor when the vehicle is in a straight traveling state and may change the setting of the straight-traveling-state position such that the motion position of the electric motor in a state in which the supply current is cut off is set as the straight-traveling-state position. That is, the steering position of the wheel is maintained at the straight-traveling-state position utilizing the self-aligning torque described above, and the motion position of the electric motor at that time is newly set as the straight-traveling-state position. In this instance, the controller preferably changes the setting of the straight-traveling-state position on conditions that i) the motion position of the electric motor changes by not less than a set amount from a time point of the cut-off of the supply current to the electric motor and ii) a change speed of the motion position of the electric motor at a present time point is not higher than a set speed.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained in detail a steering device and a steering system according to one embodiment of the present disclosure. It is to be understood that the present disclosure is not limited to the details of the following embodiment but may be embodied based on the forms described in Various Forms and may be changed and modified based on the knowledge of those skilled in the art.

A. Hardware Structure of Steering Device and Wheel Mounting Module for Vehicle

Figure 1:
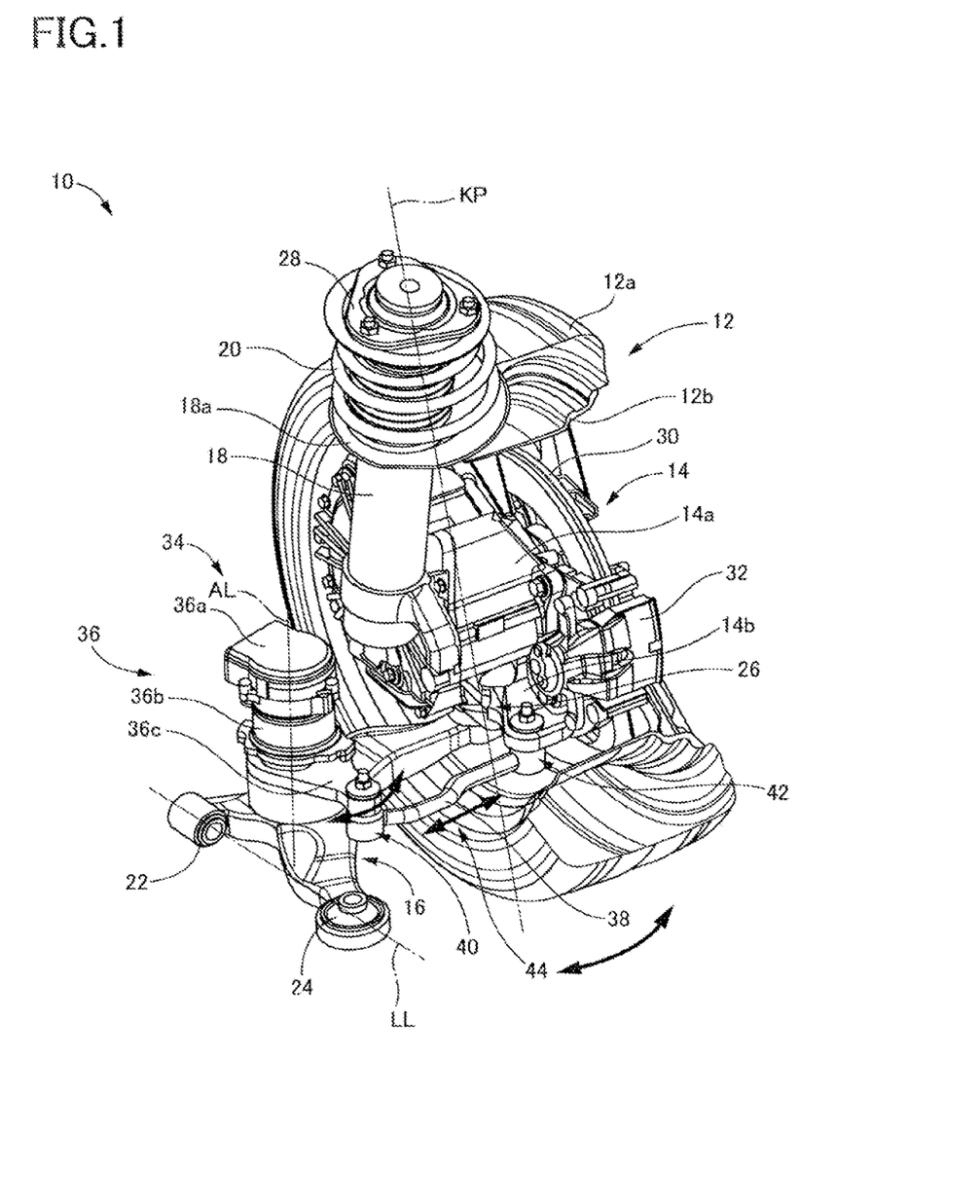
FIG. 1 is a perspective view of a vehicle wheel mounting module including a steering device according to one embodiment.

A steering device according to the embodiment is incorporated in a wheel mounting module 10 for a vehicle illustrated in FIG. 1. The wheel mounting module 10 will be hereinafter simply referred to as "module 10" where appropriate. The module 10 is for mounting, on a body of the vehicle, a wheel 12b to which a tire 12a is attached. Though the wheel 12b itself may be regarded as a wheel, the wheel 12b to which the tire 12a is attached is referred to as a wheel 12 in the present embodiment for convenience sake.

The module 10 includes a wheel drive unit 14 as a wheel driving and rotating device. The wheel drive unit 14 includes a housing 14a, an electric motor as a drive source and a speed reducer configured to reduce rotation of the electric motor (both of which are housed in the housing 14a and are not illustrated in FIG. 1), and an axle hub to which the wheel 12b is attached. (The axle hub is hidden in FIG. 1.) The wheel drive unit 14 is disposed inside a rim of the wheel 12b. The wheel drive unit 14 is what is called in-wheel motor unit. The wheel drive unit 14 is well known, and its explanation is dispensed with.

The module 10 includes a MacPherson-type suspension device (also referred to as a MacPherson strut type suspension device). In the suspension device, the housing 14a of the wheel drive unit 14 functions as a carrier which rotatably holds the wheel and which is allowed to move upward and downward relative to the vehicle body. Further, the housing 14a functions as a steering knuckle of a steering device and is allowed to move upward and downward relative to the vehicle body. The suspension device is constituted by a lower arm 16 as a suspension arm, the housing 14a of the wheel drive unit 14, a shock absorber 18, and a suspension spring 20.

The suspension device has an ordinary structure and will be briefly explained. The lower arm 16 is an L-shaped arm. A proximal end portion of the lower arm 16 is divided into two portions arranged in the front-rear direction of the vehicle. The lower arm 16 is supported at the proximal end portion thereof by a side member (not shown) of the vehicle body through a first bushing 22 and a second bushing 24 so as to be pivotable about an arm pivot axis LL. A distal end portion of the lower arm 16 is pivotably coupled to a lower portion of the housing 14a of the wheel drive unit 14 through a ball joint 26, as a first joint, for use in coupling the lower arm 16. (The ball joint 26 will be hereinafter referred to as "first joint 26" where appropriate.)

The shock absorber 18 is fixedly supported at a lower end thereof to the housing 14a of the wheel drive unit 14 and is supported at an upper end thereof by an upper portion of a tire housing of the vehicle body through an upper support 28. The suspension spring 20 is supported at an upper end thereof by the upper portion of the tire the housing of the vehicle body through the upper support 28 and is supported at a lower end thereof by a lower support 18a in the form of a flange provided on the shock absorber 18. That is, the suspension spring 20 and the shock absorber 18 are disposed between the lower arm 16 and the vehicle body so as to be parallel to each other.

The module 10 includes a brake device. The brake device includes: a disc rotor 30 attached to the axle hub together with the wheel 12b and configured to rotate with the wheel 12; and a brake caliper 32 held by the housing 14a of the wheel drive unit 14 such that the brake caliper 32 straddles the disc rotor 30. Though not explained in detail, the brake caliper 32 includes: brake pads each as a friction member; and a brake actuator including an electric motor and configured to stop rotation of the wheel 12 by pushing the brake pads against the disc rotor 30 by the force of the electric motor. The brake device is an electric brake device configured to generate a braking force in dependence on the force generated by the electric motor.

The module 10 includes a steering device 34 according to the embodiment of the present disclosure. The steering device 34 is a single-wheel independent steering device for steering only one of a pair of right and left wheels 12 independently of the other of the right and left wheels 12. The steering device 34 includes the housing 14a of the wheel drive unit 14 functioning as the steering knuckle, a steering actuator 36 provided on the lower arm 16 at a position close to the proximal end portion of the lower arm 16, and a tie rod 38 coupling the steering actuator 36 and the steering knuckle 14a. The housing 14a of the wheel drive unit 14 will be referred to as "steering knuckle 14a" when treated as a constituent element of the steering device 34.

The steering actuator 36 includes a steering motor 36a that is an electric motor as a drive source, a speed reducer 36b for decelerating rotation of the steering motor 36a, and an actuator arm 36c configured to be pivoted by the rotation of the steering motor 36a decelerated by the speed reducer 36b and functioning as a pitman arm. A proximal end portion of the tie rod 38 is coupled to the actuator arm 36c through a ball joint 40, as a second joint, for use in coupling the proximal end portion of the tie rod 38. (The ball joint 40 will be hereinafter referred to as "second joint 40" where appropriate.) A distal end portion of the tie rod 38 is coupled to a knuckle arm 14b of the steering knuckle 14a through a ball joint 42, as a third joint, for use in coupling the distal end portion of the tie rod 38. (The ball joint 42 will be hereinafter referred to as "third joint 42" where appropriate.)

In the steering device 34, a line connecting the center of the upper support 28 and the center of the first joint 26 is a kingpin axis KP. By the motion of the steering motor 36a, the actuator arm 36c of the steering actuator 36 pivots about an actuator axis AL as indicated by a bold arrow in FIG. 1, and the pivotal movement of the actuator arm 36c is transmitted to the steering knuckle 14a by the tie rod 38, so that the steering knuckle 14a is rotated about the kingpin axis KP. That is, the wheel 12 is steered as indicated by a bold arrow in FIG. 1. Thus, the steering device 34 includes a motion converting mechanism 44 constituted by the actuator arm 36c, the tie rod 38, the knuckle arm 14b, etc., for convening the rotating motion of the steering motor 36a into the steering motion of the wheel 12.

In the steering device 34, the steering actuator 36 is disposed on the lower arm 16. Thus, a work of mounting the module 10 on the vehicle body can be easily performed. That is, the proximal end portion of the lower arm 16 is attached to the side member of the vehicle body, and the upper support 28 is attached to the upper portion of the tire housing of the vehicle body, whereby the module 10 is mounted on the vehicle. 1a other words, the module 10 is excellent in mountability on the vehicle.

Figure 2:
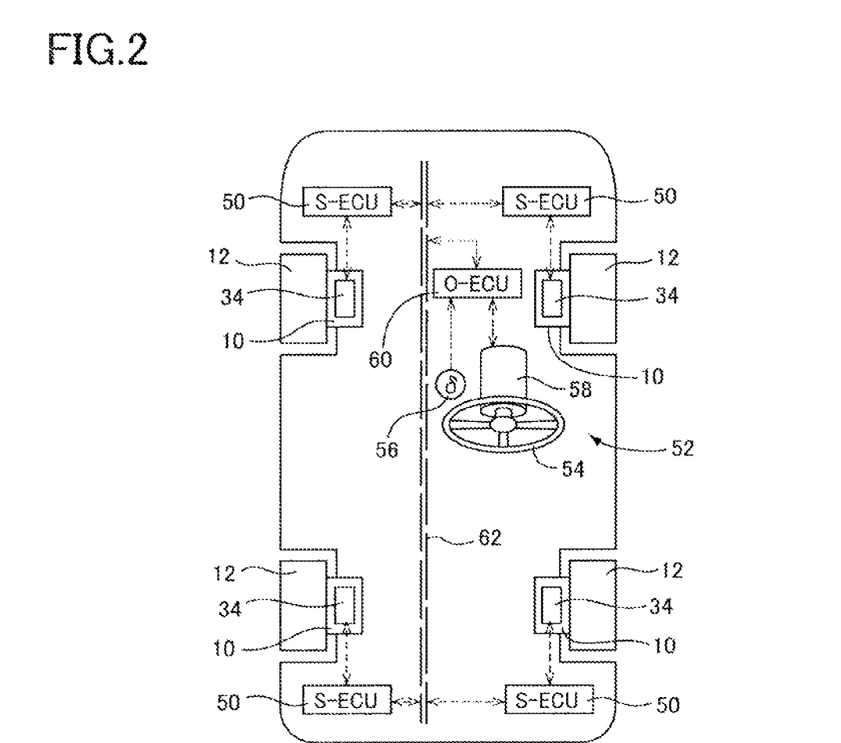
FIG. 2 is a schematic view of a vehicle on which the wheel mounting module of FIG. 1 is mounted on each wheel, namely, a schematic view of a steering system including a plurality of the steering devices according to the embodiment each of which is provided for a corresponding one of a plurality of wheels of the vehicle.

As schematically illustrated in FIG. 2, the module 10 can be provided for each of the four wheels 12, i.e., the front right and left wheels 12 and the rear right and left wheels 12. In the present vehicle, the steering devices 34 of the respective four modules 10 are controlled independently of each other by respective steering electronic control units 50 each as a controller. (Each steering electronic control unit is abbreviated as "steering ECU" and indicated as "S-ECU" in FIG. 2.) Specifically, the steering ECU 50 controls the steering motor 36a of the steering device 34 of the corresponding module 10, namely, the steering ECU 50 controls the supply current to the corresponding steering motor 36a. Thus, it is to be understood that the steering device 34 includes the steering ECU 50. In this respect the steering ECU 50 is constituted by a computer including a CPU, a ROM, a RAM, etc., and a drive circuit of the steering motor 36a. The drive circuit of the steering motor 36a is an inverter in a case where the steering motor 36a is a brushless DC motor.

In the present embodiment, it is to be understood that the vehicle is equipped with a steering system according to the embodiment including the four steering devices 34 that respectively correspond to the four wheels 12. The steering system according to the embodiment is what is called steer-by-wire steering system. The steering system includes, as its constituent element, an operation device 52 for receiving a steering operation by the driver. The operation device 52 includes: a steering wheel 54 as a steering operation member; a steering sensor 56 for detecting an operation angle (rotation angle) of the steering wheel 54 as an operation amount of the steering operation member; a reaction-force applying device 58 configured to apply an operation reaction force to the steering wheel 54; and an operation electronic control unit 60 as a controller of the operation device 52. (The operation electronic control unit is abbreviated as "operation ECU" and indicated as "O-ECU" in FIG. 2.) The steering ECUs 50 and the operation ECU 60 are connected to a car area network or controllable area network (CAN) 62 and communicable with each other via the CAN 62.

B. Control of Steering System i) Steering Control

The steering ECU 50 of the steering device 34 executes a steering control for steering the wheel 12 to a steering position ψ corresponding to the steering operation by the driver. Specifically, the steering ECU 50 of the steering device 34 obtains, as a degree of the steering operation by the driver, the operation angle of the steering wheel 54 detected by the steering sensor 56, namely, a steering operation position δ. The steering ECU 50 obtains the steering operation position S from the operation ECU 60 via the CAN 62. Based on the obtained steering operation position δ, the steering ECU 50 determines a target steering position ψ* that is the steering position ψ of the wheel 12 to be attained. Further, the steering ECU 50 controls a supply current I to the steering motor 36a such that the steering position ψ of the wheel 12 becomes equal to the target steering position ψ*. Here, a position of the steering wheel 54 for causing the vehicle to travel straight is defined as a straight-traveling-state position of the steering wheel 54. In this case, the steering operation position δ is regarded as a position change amount from the straight-traveling-state position, namely, a steering operation amount of the steering wheel 54. Further, the steering position of the wheel 12 is a synonym for a steering angle of the wheel 12. Here, a position of the wheel 12 at which the wheel 12 should be located in a straight traveling state of the vehicle is defined as a straight-traveling-state position of the wheel 12. In this case, the steering position of the wheel 12 is regarded as a phase change amount from the straight-traveling-state position, namely, a steering amount of the wheel 12. In place of the steering operation position δ, there may be employed, as the degree of the steering operation by the driver, a torque that the driver applies to the steering wheel 54, i.e., a steering operation force. The target steering position ψ* may be determined based on the steering operation force. Though not explained in detail, in a case where the wheel 12 is steered by automated driving, the steering ECU 50 may obtain the target steering position ψ* based on information from an automated driving system. In this case, the wheel 12 is steered based on the obtained target steering position ψ*.

A required steering torque Tq, which is a force of the actuator 36 necessary for steering the wheel 12 to the target steering position ψ* or for maintaining the wheel 12 at the target steering position ψ*, is determined based on a deviation of an actual steering position ψ with respect to the target steering position ψ*, namely, a steering position deviation Δψ. The steering device 34 is not equipped with a steering position sensor for detecting the actual steering position ψ. Accordingly, the required steering torque Tq is determined based on a motion position of the steering motor 36a utilizing a specific relationship between the steering position ψ of the wheel 12 and the motion position of the steering motor 36a. The steering motor 36a is a rotary-type motor. Accordingly, the motion position of the steering motor 36a is an angular position of a motor shaft. i.e., a motor rotation angle θ. Further, the motion position of the motor is regarded as a motion amount of the motor. Specifically, the motion position of the motor is regarded as a change amount of the motion position of the motor from a reference motion position. The motor rotation angle θ is regarded as a displacement angle from a reference motor rotation angle $θ_0$. The motor rotation angle θ is accumulated over 360°. The reference motor rotation angle $θ_0$ as the reference motion position is set to a straight-traveling-state motor rotation angle that is a position for causing the vehicle to travel straight, i.e., a straight-traveling-state position.

In the steering device 34, the steering ECU 50 determines, based on the target steering position ψ*, a target motor rotation angle θ* that is a target of the motor rotation angle θ. The steering motor 36a includes a motor rotation angle sensor (such as a Hall IC, a resolver or the like) for phase switching in electric current supply thereto. Based on the detection by the motor rotation angle sensor, the steering ECU 50 recognizes an actual motor rotation angle θ that is the motor rotation angle θ at the present time with respect to the reference motor rotation angle $θ_0$. (The steering device 34 is configured such that, even when an ignition switch of the vehicle is in an off state, a minute current sufficient for recognizing the actual motor rotation angle θ is supplied to the motor rotation angle sensor and the steering ECU 50.) The steering ECU 50 obtains, as a motion position deviation, a motor rotation angle deviation Δθ that is a deviation of the motor rotation angle θ with respect to the target motor rotation angle θ*. Based on the motor rotation angle deviation Δθ(=θ*−θ), the steering ECU 50 determines the required steering torque Tq according to the following expression:

$$Tq = G_P \cdot \Delta\theta + G_D \cdot (d\Delta\theta/dt) + G_I \cdot \int \Delta\theta \, dt$$

The above expression is an expression according to a feedback control law based on the motor rotation angle deviation Δθ. The first term, the second term, and the third term in the expression are a proportional term, a derivative term, and an integral term, respectively. Further, $G_P$, $G_D$, and $G_I$ represent a proportional gain, a derivative gain, and an integral gain, respectively.

The required steering torque Tq and the supply current I to the steering motor 36a are in a specific relationship relative to each other. Specifically, the required steering torque Tq depends on the force generated by the steering motor 36a, and the required steering torque Tq and the supply current I are generally proportional to each other. Accordingly, the steering ECU 50 determines the supply current I to the steering motor 36a based on the required steering torque Tq determined as described above and supplies the current I to the steering motor 36a.

When the vehicle is traveling with the wheel 12 steered, a self-aligning torque based on the suspension geometry acts on the module 10, in other words, a force to cause the wheel 12 to be located at the straight-traveling-state position acts on the module 10. For maintaining the wheel 12 at the target steering position ψ*, it is needed to supply some current I to the steering motor 36a. This current I will be hereinafter referred to as "maintaining current" where appropriate. The above expression for determining the required steering torque Tq includes the integral term. By setting the integral gain $G_I$ to an appropriate value and determining the required steering torque Tq according to the above expression, a maintaining torque for maintaining the wheel 12 at the target steering position ψ* is determined automatically. Thus, the maintaining current is determined automatically based on the maintaining torque.

The supply current I may be indirectly determined based on the motor rotation angle deviation Δθ using the required steering torque Tq as described above. The supply current I may be directly determined based on the motor rotation angle deviation Δθ according to the following expression without using the required steering torque Tq:

$$I = G_P' \cdot \Delta\theta + G_D' \cdot (d\Delta\theta/dt) + G_I' \cdot \int \Delta\theta \, dt$$

In the above expression, $G_P'$, $G_D'$, and $G_I'$ represent a proportional gain, a derivative gain, and an integral gain, respectively.

ii) Discrepancy Between Steering Position of Wheel and Motor Rotation Angle of Steering Motor and Measure for Coping with Discrepancy As explained above, a steering position ψ of the wheel 12 and a motor rotation angle θ (that is the motion position of the steering motor 36a) are associated with each other such that the straight-traveling-state position for the steering position ψ of the wheel 12 and the straight-traveling-state position for the motor rotation angle θ match to each other. In other words, the straight-traveling-state position for the motor rotation angle θ is set such that the motor rotation angle θ is equal to the reference motor rotation angle $θ_0$ when the wheel 12 is located at the straight-traveling-state position. Based on detection by the motor rotation angle sensor, the steering ECU 50 recognizes an actual motor rotation angle θ that is the motor rotation angle θ at a present time point with respect to the reference motor rotation angle $θ_0$.

However, there may be a case in which a discrepancy between the steering position ψ of the wheel 12 and the motor rotation angle θ is generated due to some reason. The steering ECU 50 recognizes the actual motor rotation angle θ even when the ignition switch is in the off state. However, in a case where electric current supply to the steering ECU 50 and the motor rotation angle sensor is completely cut off due to servicing, maintenance or the like, the steering ECU 50 loses the actual motor rotation angle θ even if the electric current is again supplied thereto. The steering device 34 of the present embodiment employs the speed reducer 36b whose speed reduction ratio is relatively large. Thus, the steering position ψ of the wheel 12 changes by only several degrees for one rotation of the steering motor 36a. On the other hand, the motor rotation angle sensor can identify an angular position of the steering motor 36a only within 360 degrees. Based on the identified angular position and the set reference motor rotation angle $θ_0$, the steering ECU 50 accumulates values of the actual motor rotation angle θ. In this case, when the electric current is again supplied to the steering ECU 50 after the cut-off, the steering ECU 50 inevitably has to set the reference motor rotation angle $θ_0$ within 360 degrees in which the steering motor 36a is currently located. When the wheel 12 is moved to a certain extent in a period during which the electric current supply is cut off, for instance, the steering motor 36a is rotated beyond 360 degrees. In a case where the steering motor 36a is rotated beyond 360 degrees, the steering ECU 50 cannot appropriately recognize the actual motor rotation angle θ, so that the discrepancy between the steering position ψ of the wheel 12 and the motor rotation angle θ is undesirably generated. It is noted that the discrepancy between the steering position ψ of the wheel 12 and the motor rotation angle θ may be regarded as a shift of the reference motor rotation angle $θ_0$ (that is the reference of the motor rotation angle θ) from the straight-traveling-state position.

In the situation in which the discrepancy between the steering position ψ of the wheel 12 and the motor rotation angle θ is generated, even if the motor rotation angle θ of the steering motor 36a is made equal to the straight-traveling-state position in an attempt to maintain the steering position ψ of the wheel 12 at the straight-traveling-state position for causing the vehicle to travel straight, the actual steering position ψ is not equal to the straight-traveling-state position irrespective of the cause for the discrepancy. That is, the vehicle travels straight with the wheel 12 steered from the straight-traveling-state position, undesirably accelerating wear of the tire 12a. Thus, the discrepancy between the steering position ψ of the wheel 12 and the motor rotation angle θ causes such a problem, for instance.

In the present steering device 34, therefore, a process of resetting the reference motor rotation angle $θ_0$ (that is the reference of the motor rotation angle θ) is executed so as to eliminate the discrepancy between the steering position w of the wheel 12 and the motor rotation angle θ. In other words, there is executed a reference changing process of changing a setting of the straight-traveling-state position for the motor rotation angle θ.

In a case where the discrepancy between the steering position ψ of the wheel 12 and the motor rotation angle θ is generated, the steering ECU 50 executes, in place of the steering control, the reference changing process on condition that the vehicle is identified to travel straight. Specifically, in a state in which the vehicle is traveling straight, the steering ECU 50 initially obtains the actual motor rotation angle θ with the discrepancy kept generated. The steering ECU 50 then sets a pre-resetting straight-traveling-state motor rotation angle $θ_M$ to be equal to the actual motor rotation angle θ. The pre-resetting straight-traveling-state motor rotation angle $θ_M$ corresponds to the straight-traveling-state position for the motor rotation angle θ before resetting. Subsequently, the supply current I to the steering motor 36a is made equal to 0. That is, the steering ECU 50 stops supplying the current I to the steering motor 36a.

In a state in which the current I stops from being supplied to the steering motor 36a, the actuator 36 no longer generates the steering torque. In this case, the wheel 12 is moved by the self-aligning torque such that the steering position ψ of the wheel 12 coincides with the straight-traveling-state position. The steering ECU 50 monitors a motor rotation angle change amount dθ that is a change amount of the actual motor rotation angle θ with respect to the pre-resetting straight-traveling-state motor rotation angle $θ_M$. When the motor rotation angle change amount dθ becomes equal to or greater than a threshold change amount $dθ_{TH}$ and a motor rotation angle change speed dθ/dt that is a change speed of the actual motor rotation angle θ becomes equal to or lower than a threshold change speed $(dθ/dt)_{TH}$, the steering ECU 50 sets the reference motor rotation angle $θ_0$ to be equal to the actual motor rotation angle θ at that time. That is, the setting of the straight-traveling-state position for the motor rotation angle θ is changed such that the straight-traveling-state position for the motor rotation angle θ coincides with the reference motor rotation angle θ. In this respect, the above condition means that i) the motion position of the steering motor 36a changes by the set amount or greater and ii) the change speed of the motion position of the steering motor 36a is equal to or lower than a set speed. That is, the condition means that the motor rotation angle θ has changed to a sufficient extent and the motor rotation angle θ no longer changes.

The detection of the discrepancy may be performed when it is identified that the vehicle is traveling straight, based on whether the current I being supplied to the steering motor 36a in the steering control is not less than a set current $I_0$. In a case where the discrepancy is generated, the steering position v of the wheel 12 deviates from, namely, does not coincide with, the straight-traveling-state position even if the motor rotation angle θ of the steering motor 36a is equal to the reference motor rotation angle $θ_0$ that is the straight-traveling-state position. Therefore, to counter the self-aligning torque for returning the wheel 12 to the straight-traveling-state position, a certain amount of the current I is being supplied to the steering motor 36a in an attempt to generate a certain degree of the required steering torque Tq. It may be accordingly determined that the discrepancy is generated when the supply current I is not less than the set current $I_0$.

For instance, the detection of the discrepancy is performed based on the supply current I to the steering motor 36a determined by the steering EC-U 50 on condition that the target motor rotation angle θ*, which is determined in the steering control based on the operation position δ of the steering wheel 54, is determined as the straight-traveling-state position and the actual motor rotation angle θ is maintained at the straight-traveling-state position.

The steering system of the present embodiment includes four steering devices 34 provided respectively for the four wheels 12, i.e., front right and left wheels 12 and rear right and left wheels 12. The four steering devices 34 are controlled in a centralized manner by the operation ECU 60 functioning as a controller of the operation device 52. In the steering system, without relying on information as to the steering operation by the driver, the operation ECU 60 identifies that the vehicle is traveling straight, namely, the operation ECU 60 estimates that the motor rotation angle θ of the steering motor 36a of the steering device 34 is maintained at the straight-traveling-state position, based on information as to the supply current I to the steering motor 36a sent from each steering device 34. The operation ECU 60 then detects, in each steering device 34, the discrepancy between the steering position ψ of the wheel 12 and the motor rotation angle θ of the steering motor 36a.

Specifically, the operation ECU 60 identifies that the vehicle is traveling straight when the supply current I to the steering motor 36a in each of three or more of the four steering devices 34 is less than the set current $I_0$. Based on the identification, in a case where the supply current I to the steering motor 36a in one of the four steering devices 34 is not less than the set current $I_0$, the operation ECU 60 determines that the discrepancy between the motor rotation angle θ of the steering motor 36a and the steering position ψ of the wheel 12 is generated in the one steering device 34. In this case, the operation ECU 60 sends, to the steering ECU 50 of the one steering device 34 suffering from the discrepancy, information to the effect that the discrepancy is generated and information to the effect that the vehicle is identified to be traveling straight. The steering ECU 50 that receives the information executes, based on the information, the reference changing process of changing the setting of the straight-traveling-state position for the motor rotation angle θ so as to eliminate the discrepancy.

The present steering system is configured to perform the detection of the discrepancy and the identification of the straight traveling of the vehicle based on the supply current I to the steering motor 36a. As explained above, the supply current I to the steering motor 36a and the required steering torque Tq are in a specific relationship relative to each other. Thus, the above-indicated detection and identification may be performed based on the required steering torque Tq determined in the steering control, in place of the supply current I. That is, it may be identified that the discrepancy is generated in a case where the required steering torque Tq at a time when the motor rotation angle θ is maintained at the straight-traveling-state position is not less than a set torque in one steering device 34. Further, it may be identified that the vehicle is traveling straight in a case where the required steering torque Tq in each of three or more of the four steering devices 34 is less than the set torque.

iii) Control Flow

In the present steering system, each steering ECU 50 executes a steering control program and a program for the motor-rotation-angle reference changing process, so as to execute the steering control and the reference changing process, respectively. Further, the operation ECU 60 executes a program for straight traveling identification and discrepancy detection, so as to execute the identification of the straight traveling of the vehicle and the detection of the discrepancy between the steering position ψ of the wheel 12 and the motor rotation angle θ in each steering device 34. Hereinafter, there will be briefly explained processing according to the programs.

Figure 3:
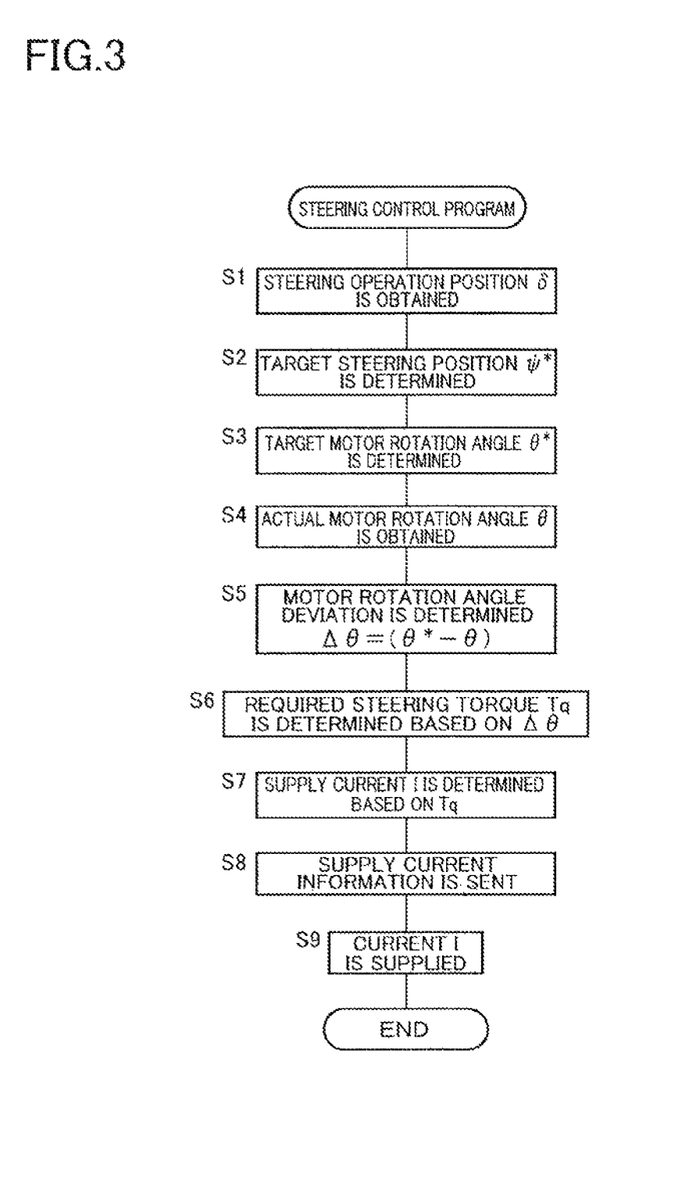
FIG. 3 is a flowchart of a steering control program executed in the steering system.

The steering control program indicated by a flowchart of FIG. 3 is repeatedly executed by each steering ECU 50 at a short time pitch, e.g., about several to several tends of milliseconds (msec). In the processing according to the program, the operation position δ of the steering wheel 54 is obtained at Step 1. (Hereinafter, Step S1 is abbreviated as "S1", and other steps will be similarly abbreviated.) At S2, the target steering position ψ* that is a control target of the steering position ψ of the wheel 12 is determined based on the obtained operation position δ. At S3, the target motor rotation angle θ* that is a control target of the motor rotation angle θ is determined based on the determined target steering position ψ*.

At S4, the actual motor rotation angle θ, which is the motor rotation angle of the steering motor 36a at the present time point, is obtained based on the detection by the motor rotation angle sensor. At S5, the motor rotation angle deviation Δθ, which is a deviation of the actual motor rotation angle θ with respect to the target motor rotation angle ψ*, is determined. At S6, based on the determined motor rotation angle deviation Δθ, the required steering torque Tq, which is the steering torque to be generated by the actuator 36, is determined according to the above expression relating to the feedback control law. At S7, the supply current I to be supplied to the steering motor 36a is determined based on the determined required steering torque Tq. At S8, information as to the determined supply current I is sent to the operation ECU 60 via the CAN 62. At S9, the determined supply current I is supplied to the steering motor 36a.

Figure 4:
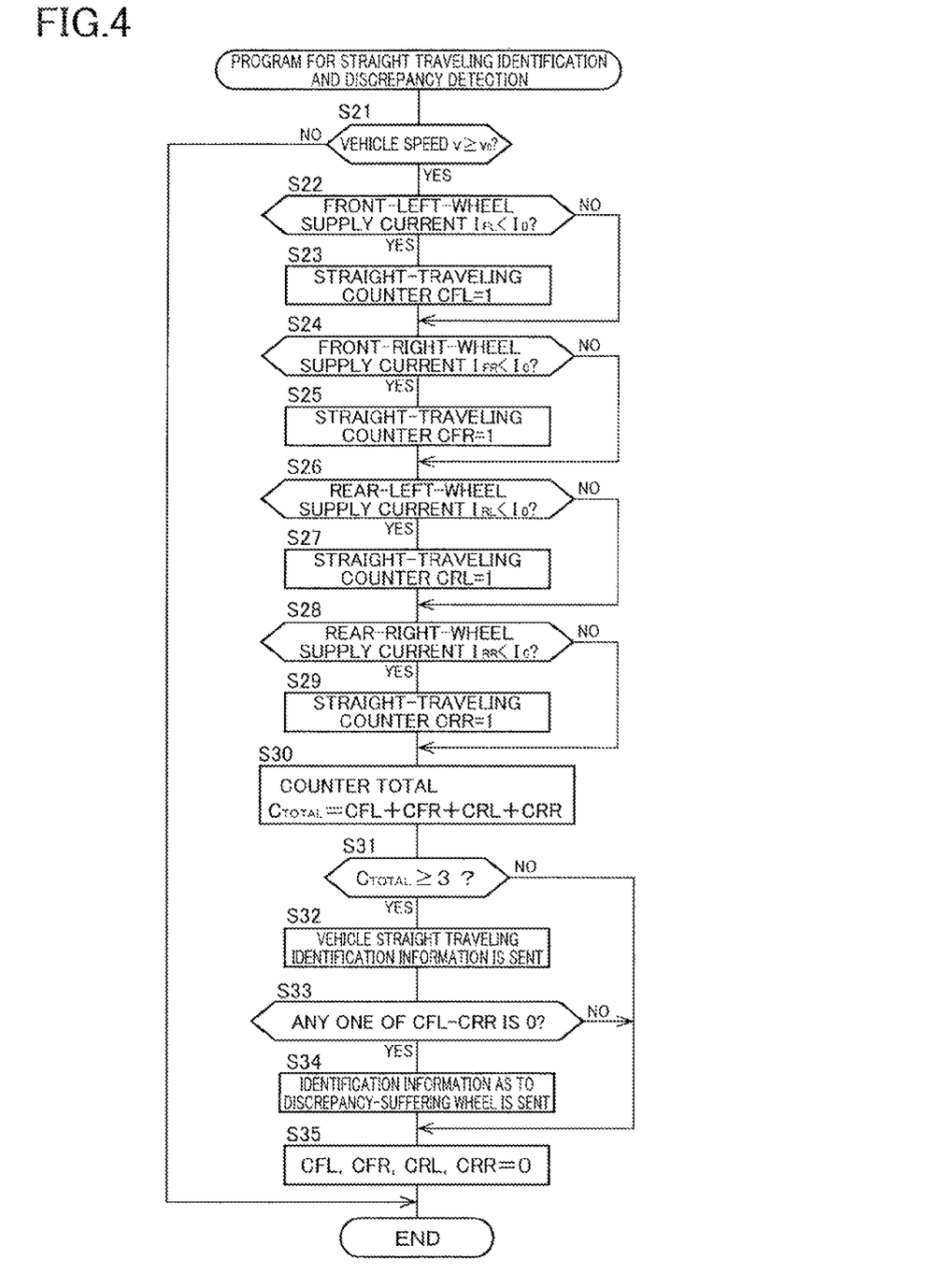
FIG. 4 is a flowchart of a program for straight traveling identification and discrepancy detection executed in the steering system.

The program for straight traveling identification and discrepancy detection indicated by a flowchart of FIG. 4 is executed repeatedly by the operation ECU 60 at certain time intervals (e.g., 5-10 minutes). Processing according to the program starts with S21 to determine whether a running speed v of the vehicle (hereinafter referred to as "vehicle speed v" where appropriate) based on information from a brake system (not shown) is not lower than a set vehicle speed $v_0$. When the vehicle speed v is lower than the set vehicle speed $v_0$, a sufficient degree of the self-aligning torque cannot be obtained, so that execution of the program is ended.

When the vehicle speed v is not lower than the set vehicle speed $v_0$, the control flow proceeds to S22 to determine whether a front-left-wheel supply current $I_{FL}$ is less than the set current $I_0$. The front-left-wheel supply current $I_{FL}$, is the supply current I to the steering motor 36 determined in the steering device 34 provided for the front left wheel 12. When the front-left-wheel supply current $I_{kl}$ is less than the set current $I_0$, the control flow proceeds to S23 at which a straight-traveling counter CFL is set to 1. The straight-traveling counter CFL is a counter provided for the front left wheel 12 and its initial value is 0. The processing similar to that of S22 and S23 is executed at S24-S29 for supply currents $I_{FR}$, $I_{RL}$, $I_{RR}$ of the front right wheel 12, the rear left wheel 12, and the rear right wheel 12, respectively.

At S30, a counter total $C_{TOTAL}$ is obtained by summing up the straight-traveling counters CFL, CFR, CRL, CRR of the front left wheel 12, the front right wheel 12, the ar left wheel 12, the rear right wheel 12. Subsequently, it is determined at S31 whether the counter total $C_{TOTAL}$ is three or more. When the counter total $C_{TOTAL}$ is three or more, the control flow proceeds to S32 to send, to each steering ECU 50, identification information to the effect that the vehicle is traveling straight. When it is identified that the vehicle is traveling straight, it is determined at S33 whether a value of any one of the straight-traveling counters CFL, CFR, CRL, CRR is equal to 0. When it is determined that the value of any one of the straight-traveling counters CFL, CFR, CRL, CRR is equal to 0, it is identified that the discrepancy between the steering position ψ of the wheel 12 and the motor rotation angle θ of the steering motor 36a is generated in the steering device 34 provided for the wheel 12 corresponding to the one of the straight-traveling counters CFL, CFR, CRL, CRR. In other words, the wheel 12 suffering from the discrepancy is identified. At S34, information to the effect that the discrepancy is generated is sent to the steering ECU 50 of the steering device 34 in question.

The control flow proceeds to S35 to reset, to 0, the values of the straight-traveling counters CFL, CFR, CRL, CRR i) when the vehicle is not traveling straight, ii) when it is identified that the discrepancy is generated in none of the steering devices 34 provided for the respective four wheels 12, and iii) when it is identified that the discrepancy is generated in any one of the wheels 12. Thus, execution of the program is ended.

Figure 5:
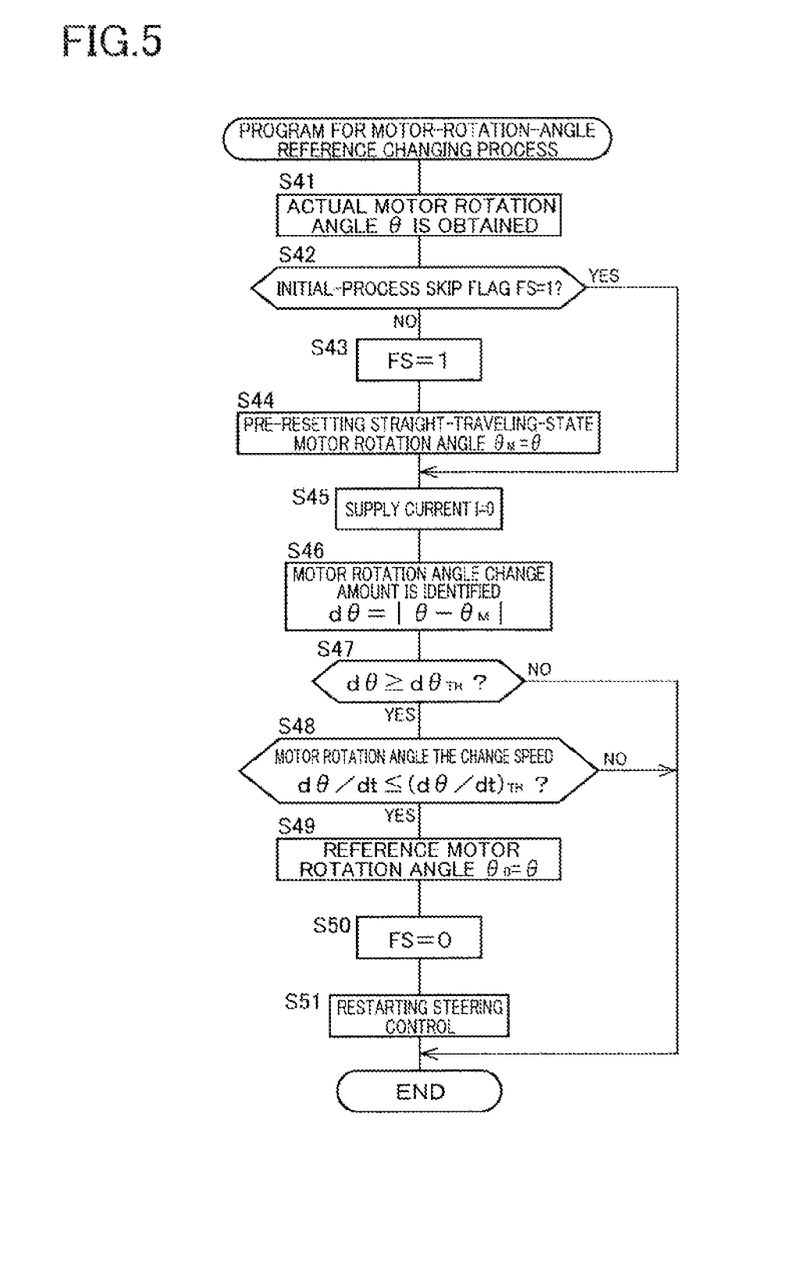
FIG. 5 is a flowchart of a program for a motor-rotation-angle reference changing process.

The steering ECU 50 repeatedly executes, in place of the steering control program, the program for the motor-rotation-angle reference changing process indicated by a flowchart of FIG. 5 at a short time pitch, e.g., several to several tens of milliseconds (msec). The steering ECU 50 executes the program on condition that the steering ECU 50 receives, from the operation ECU 60, information to the effect that the vehicle is traveling straight and information to the effect that the discrepancy is generated in the corresponding steering device 34.

Processing according to the program for the motor-rotation-angle reference changing process starts with S41 to obtain the actual motor rotation angle θ. At S42, it is determined whether a value of an initial-process skip flag FS is equal to "1". The initial-process skip flag FS, whose initial value is "0", is set to 1 in a case where current execution of the program is not initial execution. When the value of the initial-process skip flag FS is "0", the value of the initial-process skip flag FS is set to "1" at S43. At S44, the pre-resetting straight-traveling-state motor rotation angle $\theta_M$ is made equal to the obtained actual motor rotation angle θ. When it is determined at S42 that the value of the initial-process skip flag FS is not "1", S43 and S44 are skipped.

At S45, the supply current I to the steering motor 36a is determined to be 0. That is, the electric current I stops from being supplied to the steering motor 36a. At S46, the motor rotation angle change amount dθ is identified based on the actual motor rotation angle θ obtained in current and previous execution of the program. The motor rotation angle change amount dθ is a change amount of the actual motor rotation angle θ obtained after having stopped supplying the current I to the steering motor 36a. At S47, it is determined whether the motor rotation angle change amount dθ is not less than the threshold change amount $d\theta_{TH}$. At S48, it is determined whether the motor rotation angle change speed dθ/dt, which is the change speed of the actual motor rotation angle θ, is not higher than the threshold change speed $(d\theta/dt)_{TH}$. When the motor rotation angle change amount dθ is not less than the threshold change amount $d\theta_{TH}$ and the motor rotation angle the change speed dθ/dt is not higher than the threshold change speed $(d\theta/dt)_{TH}$, the control flow proceeds to S49 at which the reference motor rotation angle $\theta_0$ is set to be equal to the actual motor rotation angle θ at the present time, so as to change the setting of the straight-traveling-state position. At S50, the value of the initial-process skip flag FS is reset to "0". At S51, it is determined to restart the steering control.

When it is determined at S47 that the motor rotation angle change amount dθ is less than the threshold change amount $d\theta_{TH}$ or when it is determined at S48 that the motor rotation angle change speed dθ/dt is higher than the threshold change speed $(d\theta/dt)_{TH}$, S49-S51 are skipped and one execution of the program is ended.

What is claimed is:

1. A steering device installed on a vehicle including a plurality of steerable wheels and configured to independently steer a wheel which is one of the plurality of steerable wheels, comprising:
   an electric motor as a drive source;
   a motion converting mechanism configured to convert a motion of the electric motor into a steering motion of the wheel; and
   a controller configured to control a supply current to the electric motor so as to achieve steering of the wheel corresponding to a motion position of the electric motor,
   wherein, to eliminate a discrepancy between the motion position of the electric motor and a steering position of the wheel detected based on the supply current to the electric motor supplied when the motion position of the electric motor is maintained at a straight-traveling-state position, the controller executes a reference change process of changing a setting of the straight-traveling-state position,
   wherein, in the reference change process, the controller cuts off the supply current to the electric motor when the vehicle is in a straight traveling state and changes the setting of the straight-traveling-state position such that the motion position of the electric motor in a state in which the supply current is cut off is set as the straight-traveling-state position.

2. The steering device according to claim 1, wherein the controller determines a target motion position that is the motion position of the electric motor corresponding to the steering position to which the wheel is to be steered and determines the supply current to the electric motor based on a motion position deviation that is a deviation of an actual motion position of the electric motor with respect to the target motion position.

3. The steering device according to claim 1, wherein the discrepancy is identified when the supply current to the electric motor is not less than a set current in a state in which the motion position of the electric motor is maintained at the straight-traveling-state position or in a state in which the motion position of the electric motor is estimated to be maintained at the straight-traveling-state position.

4. The steering device according to claim 1, wherein, in the reference change process, the controller changes the setting of the straight-traveling-state position on condition that i) the motion position of the electric motor changes by not less than a set amount from a time point of the cut-off of the supply current to the electric motor and ii) a change speed of the motion position of the electric motor at a present time point is not higher than a set speed.

5. A steering system comprising:
   a steering device installed on a vehicle including a plurality of steerable wheels and configured to independently steer a wheel which is one of the plurality of steerable wheels, the steering device comprising:
   an electric motor as a drive source;

a motion converting mechanism configured to convert a motion of the electric motor into a steering motion of the wheel; and a controller configured to control a supply current to the electric motor so as to achieve steering of the wheel corresponding to a motion position of the electric motor, wherein, to eliminate a discrepancy between the motion position of the electric motor and a steering position of the wheel detected based on the supply current to the electric motor supplied when the motion position of the electric motor is maintained at a straight-traveling-state position, the controller executes a reference change process of changing a setting of the straight-traveling-state position wherein the steering device is provided for each of at least three wheels of the vehicle, wherein the system is configured to:

identify that the discrepancy between the motion position of the electric motor and the steering position of the wheel is generated in the steering device provided for one wheel among the at least three wheels when i) the supply current to the electric motor is not less than a set current in the steering device provided for the one wheel among the at least three wheels and ii) the supply current to the electric motor is less than the set current in the steering devices each provided for a corresponding one of at least two wheels which are the reminder of the at least three wheels except the one wheel; and execute the reference change process of changing the setting of the straight-traveling-state position so as to eliminate the discrepancy in the steering device provided for the one wheel among the at least three wheels.

* * * * *